United States Patent [19]

Box et al.

[11] Patent Number: 4,481,630
[45] Date of Patent: Nov. 6, 1984

[54] SPARK GAP SWITCH

[75] Inventors: Stephen J. C. Box; Ronald J. Kovach; Andre J. Desroziers, all of London, Canada

[73] Assignee: Photochemical Research Associates Inc., London, Canada

[21] Appl. No.: 327,072

[22] Filed: Dec. 3, 1981

[51] Int. Cl.³ .............................................. H01S 3/09
[52] U.S. Cl. .................... 372/38; 313/601; 315/326
[58] Field of Search .............. 313/601, 602, 603; 315/326; 372/38, 81, 86, 87

[56] References Cited

U.S. PATENT DOCUMENTS

| | | | |
|---|---|---|---|
| 3,356,888 | 12/1967 | Germeshausen et al. | 315/326 |
| 4,053,853 | 10/1977 | Collins | 372/87 |
| 4,130,809 | 12/1978 | Hasson et al. | 372/87 |
| 4,223,278 | 9/1980 | Colson et al. | 372/87 |
| 4,259,617 | 3/1981 | Godard | 372/87 |

FOREIGN PATENT DOCUMENTS 756738 4/1967 Canada.

Primary Examiner—James W. Davie
Attorney, Agent, or Firm—Sim & McBurney

[57] ABSTRACT

A spark gap switch is disclosed. The spark gap comprises opposite and adjacent electrodes and a trigger arrangement for triggering a discharge arc between the opposite and adjacent electrodes. The trigger arrangement includes a solid insulative material to facilitate a discharge between trigger electrodes to trigger the spark gap. The trigger arrangement is located rearwardly of the adjacent electrode to position the solid insulative material in a manner to prevent a main discharge arc affecting the structural integrity of the solid insulative material. Such an arrangement provides protection for the solid insulative material to increase lifetime of the unit and has the capability of reducing jitter.

7 Claims, 6 Drawing Figures

SPARK GAP SWITCH

FIELD OF THE INVENTION

This invention relates to high voltage switches and in particular those which employ the use of a spark gap.

BACKGROUND OF THE INVENTION

High voltage switch technology is used in many areas such as laser technology, lightening protection devices and other areas requiring the switching of high voltage. Spark gaps are often used as effective high voltage switches, the technology of which is summarized in a paper by Tommy R. Burkes et al, A Review of High Power Switching Technology, IEEE Transactions on Electron Devices, Volume ED-26, No. 10, October 1979, 1405. Spark gaps commonly employ the use of a trigger arrangement to ionize the gap between the electrodes to cause a breakdown of the gap with a consequent discharge arc between the electrodes. In using a trigger arrangement, if the potential between the spark gap electrodes is at a sufficiently high potential for the spacing, the ionizing of the gas in the gap by triggering the arrangement with a trigger signal provides a selectively operable high voltage switch.

To improve the firing of the trigger arrangement, a dielectric material may be used as spaced between the trigger electrodes. According to Lavoie et al in their paper "Spark Chamber Pulsing System", The Review of Scientific Instruments, Volume 34, No. 41, November 1964, 1567, such use of a dielectric material reduces the voltage requirements in the signal to trigger a main discharge in the spark gap. According to this paper, barium titanate having a high dielectric constant is useful.

It is common to use a spark gap in laser circuitry to reduce almost instantaneously the potential of one of the electrodes of a laser cavity to excite the cavity region and roduce lasing action. Hasson, U.S. Pat. No. 4,035,683 discloses the use of a spark gap with a laser cavity to control the timing in initiating or commencing the lasing action of a laser. The important aspects in using a spark gap for a laser is that the jitter time, that is the period from when the trigger signal is applied to the trigger arrangement and the discharge arc occurs in the spark gap, is reasonably constant. In some laser applications, a jitter of only three to five nanoseconds is desirable.

A spark gap using a high dielectric constant material between the trigger pin and the trigger electrode, such as the arrangement of Lavoie et al where the main discharge is between the high voltage electrode and the trigger electrode configuration, is particularly advantageous for use with lasers. Only a comparatively low voltage is necessary to pulse the trigger pin to cause a sufficient electron and ion density in the spark gap to provide breakdown and consequent arcing in the spark gap. However, it has been found that the solid high dielectric constant material is chipped away or fractured by the intensity of the discharge arc as it travels to the adjacent trigger electrode. As the barium titanate is worn away by the discharge arc, jitter of the spark gap is increased and the arrangement becomes impractical from a precise switching standpoint and may become inoperable.

The spark gap, according to this invention, overcomes the above problem, has extended life and the capability of producing relatively low jitter so that the spark gap is particularly useful with lasers.

SUMMARY OF THE INVENTION

The spark gap, according to this invention, for switching high voltages comprises opposite and adjacent electrodes having opposing areas spaced-apart a predetermined distance to establish a spark gap. A main discharge arc occurs between the opposing electrode areas when the spark gap is triggered. The trigger arrangement, which includes the use of a solid insulative material, is located rearwardly of the adjacent electrode area to position such insulative material in a manner to prevent a triggered main discharge arc affecting the structural integrity of the insulative material. Such an arrangement provides for the desirable use of the various well known insulative materials in the triggering arrangement for the spark gap, yet avoids any destructive effects the high current discharge arc has on the insulative material to provide a reliable, long-wearing, low-jitter spark gap.

When the spark gap is used as a switch in controlling the firing of the laser, the opposite electrode is electrically connected to a laser electrode. In triggering the spark gap, the laser electrode has its potential suddenly lowered relative to the other electrode as is common in the Blumlein laser circuit.

A housing may be provided for the spark gap to contain insulating gases, which may be under pressure in the spark gap. The portion of the opposite electrode may be adjustable to vary the distance between the opposite and adjacent electrodes dependent upon the voltage on the opposite electrode and gaseous pressure. The relative spacing between trigger electrodes may be adjustable in the housing to provide an optimum trigger discharge when the trigger voltage is applied.

The insulative material on the trigger arrangement preferably has a dielectric constant greater than 80. Such material may be barium titanate, although it is appreciated that many other types of solid insulative materials can be used such as other ceramics of synthetic plastics.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
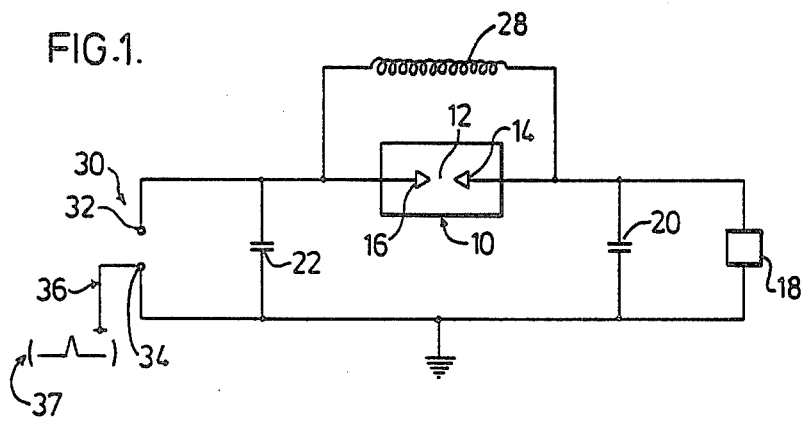
FIG. 1 is a schematic of a standard Blumlein circuit for a laser.

The high voltage switch, according to this invention, has many uses in the field of spark gaps for rapid switching of high voltages. To demonstrate a preferred use of this spark gap, reference is made to controlling the timing of firing a laser. Referring to FIG. 1, a schematic of a laser circuit is shown. The laser 10 comprises a cavity 12 with a spaced-apart laser electrodes 14 and 16. A direct current high voltage source 18 charges the electrodes 14 and 16 to the same voltage through storage capacitor 20 and pulse shaping capacitor 22. The electrodes 14 and 16 are galvanically interconnected by an inductance 28. With the electrodes 14 and 16 charged to the same level by source 18, no discharge in gap 12 occurs. To initiate a discharge in gap 12, a trigger arrangement 30 is used. The trigger arrangement comprises spaced-apart electrodes 32 and 34 with a trigger pin 36. A trigger signal 37 is applied to the trigger pin 36 which causes a breakdown between the gap 32 and 34. The developed arc discharge across electrodes 32, 34 drops the voltage on electrode 16 towards the level of ground to set up a highly stressed electric field across the laser cavity 12 of short duration to result in a population inversion, which gives rise to a stimulated emission of lasing radiation from the laser cavity.

Figure 2:
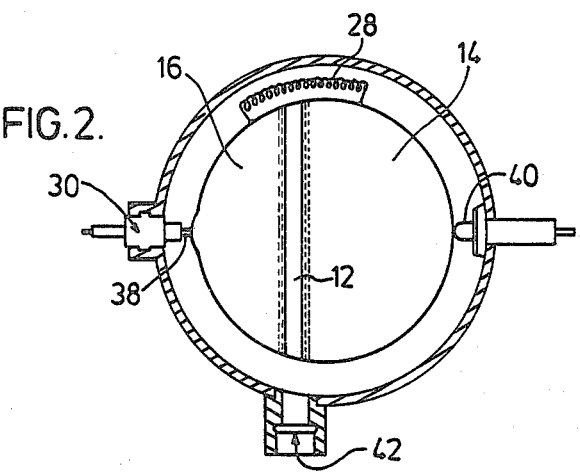
FIG. 2 is a top plan view of a laser cavity.

Exemplary of the laser cavity of FIG. 1 is that shown in FIG. 2. The electrode 14 is spaced apart from the electrode 16 and is interconnected by inductance 28. A spark gap arrangement 30 is in contact with the electrode 16 by way of the contact at 38. The voltage from source 18 is applied to electrode 14 through pin connection 40. The lasing action in cavity 12 propagates outwardly of the cavity through window 42.

Figure 3:
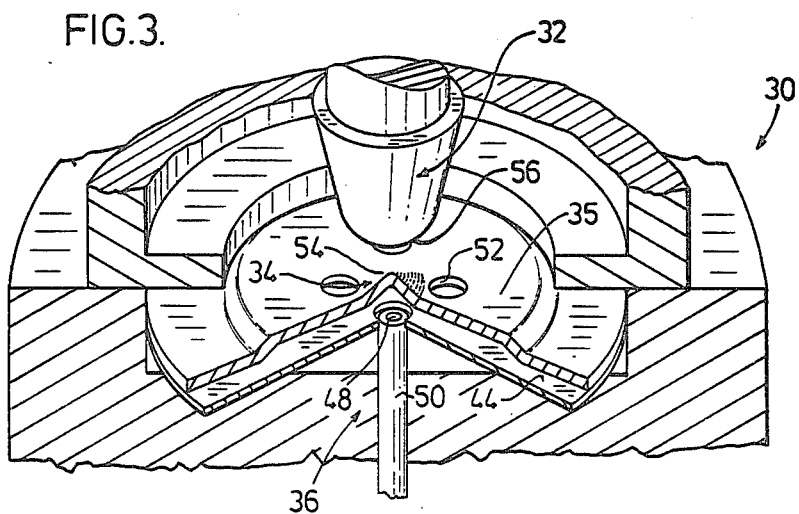
FIG. 3 is a perspective view of the spark gap according to this invention.

The spark gap device 30 is shown generally in FIG. 3. The spark gap comprises an opposite electrode 32 and an adjacent electrode 34 which were schematically shown in FIG. 1. The trigger arrangement 36 comprises trigger electrodes 44 and 48. Electrode 48 is a cylindrical pin which is surrounded by a solid insulative sleeve 50. The sleeve is of a material, which according to this preferred embodiment, has a high dielectric constant for use in separating the trigger pin 48 from the trigger electrode 44. The adjacent electrode 34 is electrically connected to the trigger electrode 44 by way of a perforated circular plate 35 which has a plurality of apertures 52 formed therein to permit the electrons generated by a discharge in the trigger arrangement 36 to flow towards the positively charged opposite electrode 32 to trigger a breakdown in the spark gap. Photons generated by the trigger discharge may also radiate through the apertures 52 into the spark gap to ionize the gas. According to this preferred embodiment, the central portion of the adjacent electrode 34 is raised at 54 to oppose a rounded area at 56 on the opposite electrode to provide the opposing areas between which a main discharge arc occurs. In providing the raised portion for the adjacent electrode, the jitter of the spark gap is slightly reduced compared to the use of a planar adjacent electrode area. It is thought that the raised area provides a better defined region to which the arc can consistently travel, once the discharge is triggered to result in a more constant period between trigger pulse and spark gap breakdown. It is appreciated that sharp edges on the opposite and adjacent electrode areas are to be avoided to not create highly stressed electrical fields in such areas which could result in an uncontrolled breakdown of the spark gap. Thus all functional edges of the electrodes are smoothly rounded.

Figure 4:
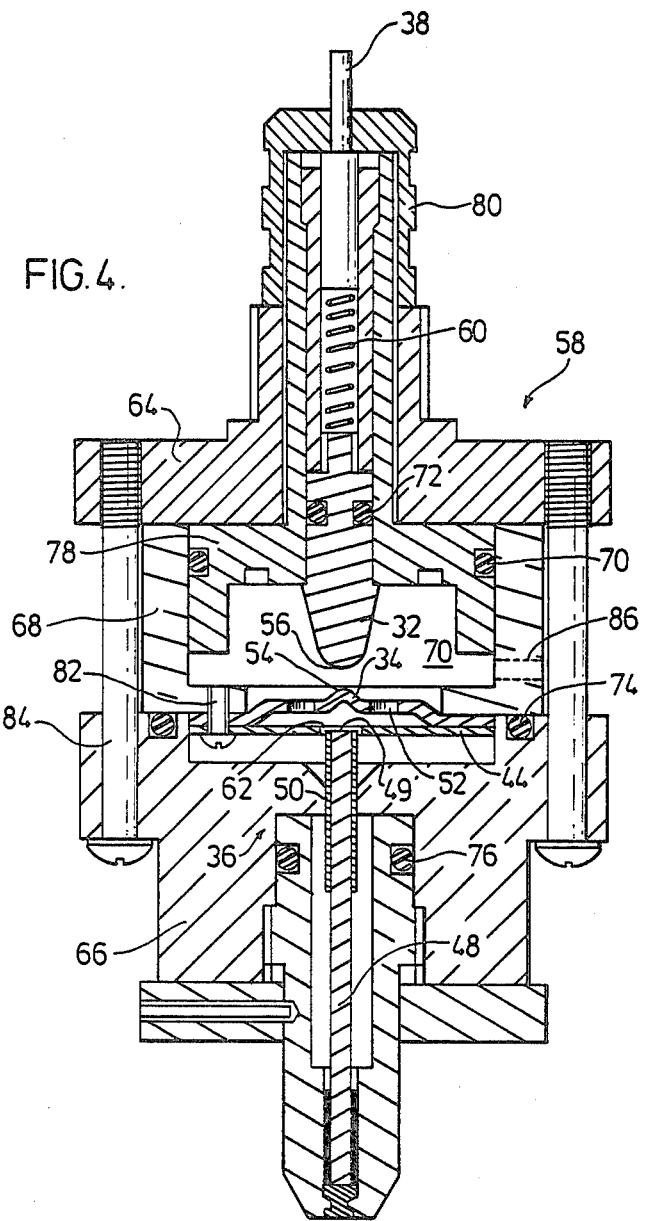
FIG. 4 is a cross-section of the spark gap with housing particularly adapted for use with lasers.

This structure, as shown in FIG. 4 with a housing generally designated 58, is particularly adapted for use with a laser circuitry of the type of FIG. 1. The spark gap arrangement 36 has pin 38 spring loaded in the opposite electrode area by spring 60, for contacting electrode 16 of the laser cavity of FIG. 2. The sleeve 50 of insulative high dielectric constant material is useful in not only reducing the signal voltage to initiate trigger discharge, but also to facilitate physical location of the trigger pin 48 in the aperture 62 of the trigger electrode 44. The sleeve 50 may contact the aperture wall 62 in providing the necessary spacing between pin end 49 and wall 62 without detracting from the reliability in forming a trigger discharge.

The housing 58 for the spark gap comprises endcaps 64 and 66 which have sandwiched therebetween circular block 68 to define a space 70 housing the opposite electrode 32, the adjacent electrode 34 and the trigger arrangement 36. The space 70 is sealed by O-rings 72, 74 and 76, so that pressurized insulative gases may be contained in the space 70. To complete the cavity and seal with the opposite electrode, an additional housing block 78 is provided which is connected within the support 80 for the opposite electrode 32. The opposite electrode 32 is mounted in the support 80 so as to be movable inwardly and outwardly relative to the adjacent electrode 34. This provides adjustability in the space between the opposing areas 54 and 56 of the spark gap electrodes in handling various magnitudes of voltages for switching.

The trigger electrode 44 and the supportive plate 35 for the adjacent electrode 34 are electrically interconnected as mounted to block 68 by spaced-apart threaded bolts 82. By tightening bolts 84, the endcaps 64, 66 are squeezed together to complete the enclosed space 70. Insulative gas for the spark gap between electrode areas 54, 56 may be supplied to the enclosed space 70 through a duct 80, as shown in dotted lines, with appropriate connective elements. The gases may be pressurized in enclosure 70 to provide for a decrease in the spark gap spacing.

In the arrangement shown, opposite electrode 56, as connected to electrode 16 of the laser, is at a high potential relative to adjacent electrode 34. The spacing between electrode areas 54, 56 is such that the gap does not break down for the high voltage applied to electrodes 32 and 34. To cause a breakdown, flow of electrons and radiation of photons into the spark gap is provided for by the trigger arrangement 36. To initiate a trigger discharge between the end 49 of the trigger pin 48 and the trigger electrode aperture wall 62, a signal in the form of a voltage pulse is applied to pin 48. As previously mentioned, the trigger electrode 44 may be electrically connected to the adjacent electrode 34 so that they are at the same potential. According to the circuitry of FIG. 1, this is at ground. The signal to pin 48 may, therefore, be a negative pulse below ground which repels and thereby enhances the flow of electrons into the spark gap.

It has been found that in using a solid high dielectric constant material, such as barium titanate, as the insulative sleeve 50, the voltage applied to achieve a trigger discharge is considerably less than with other arrangements and may for certain parameters be in the range of 4000 volts. The signal generates a discharge in the trigger pin area and is sustained by continuing the application of the signal to pin 48. The positively charged opposite electrode 32 attracts the so generated electrons into the spark gap area through the apertures 52 of the plate support 35 for the adjacent electrode 34. As the electrons and photons, which move into the spark gap, ionize this space, the gap breaks down and a discharge arc is initiated between opposing electrode areas 54, 56 to pull down the potential on electrode 16 of the laser cavity by discharging capacitor 22.

Jitter is an expression used to quantify the variation in the time from when the signal is first applied to the trigger pin 48 to the time when the main discharge arc occurs between surfaces 54 and 56. It has been found with this arrangement that jitter can be maintained in the range of 1 to 3 nanosecond variation for a 40 nanosecond delay time from the commencement of forming the trigger signal to the formation of the discharge arc. It is appreciated, of course, that the delay time after the trigger signal may be changed as desired by altering to a new level the pressure of the gas in the space 70, or the spacing between electrodes 54, 56, or the potential applied to the opposite electrode 32.

It has been found that the extent of jitter is in direct relation to the delay time between trigger signal and spark gap breakdown. It is, therefore, important, when it is desired to minimize jitter, to reduce as much as possible the delay time. By using the high dielectric constant material in the trigger arrangement, this permits the use of a lesser trigger voltage. A part of this delay time is the time taken to actually produce the trigger signal. With an avalanche transistor trigger circuit of the type disclosed in the aforementioned Lavoie et al paper, a 4000 volt signal may be generated in approximately ten nanoseconds, it taking another approximately 30 nanoseconds to generate the trigger discharge and cause a main discharge in the spark gap. Therefore, the avalanche transistor circuit has proven most useful in minimizing the delay time in providing a switch for high voltages.

Figure 5:
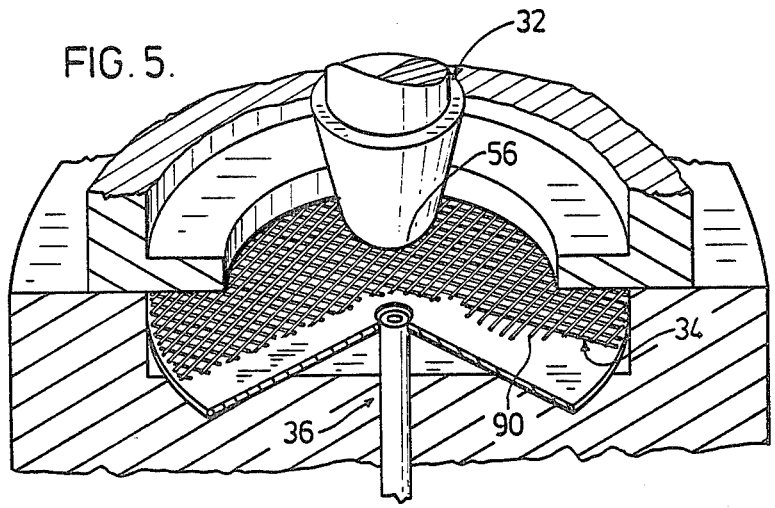
FIG. 5 shows an alternative embodiment of the spark gap employing a screen as an adjacent electrode.

In keeping with the invention, an alternative embodiment is shown in FIG. 5. An opposite electrode 32 is mounted in the manner of FIG. 4 relative to an adjacent electrode 34 which is in the form of a metal wire mesh or screen having spaced-apart wire members 90. Located beneath and spaced from the adjacent electrode 34 is the trigger arrangement 36. The wire mesh 90 permits the electrons generated by a trigger discharge to flow through the mesh towards the opposite electrode 32 and thereby breakdown the gap between the area 56 of the opposite electrode and the wire members 90 beneath this area to provide for a discharge arc.

Figure 6:
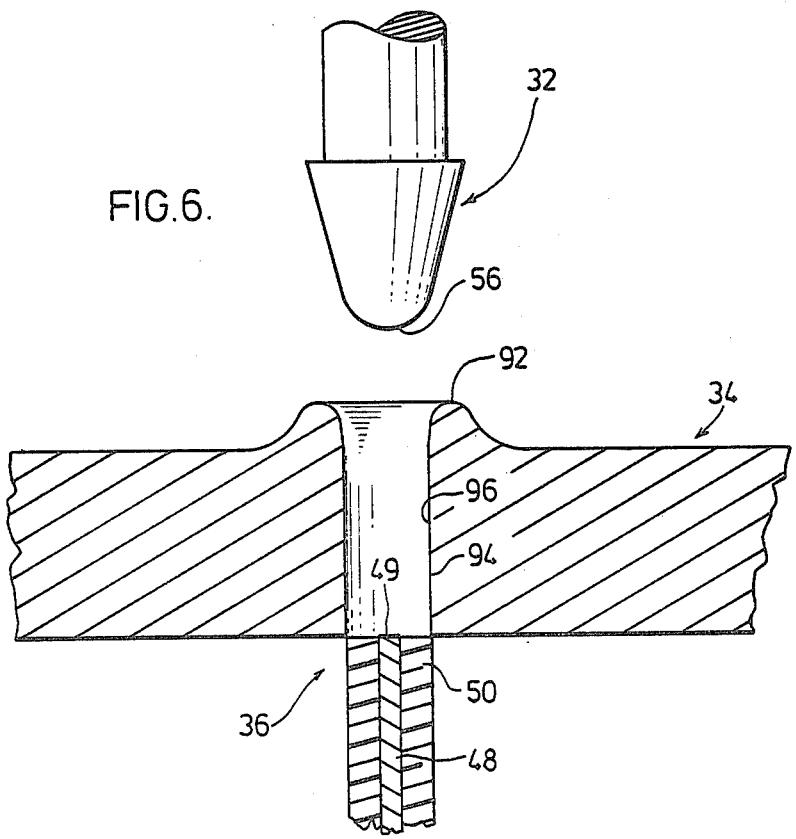
FIG. 6 is another preferred embodiment for the spark gap according to this invention.

An alternative embodiment is shown in FIG. 6 where the opposite electrode 32 has its area 56 opposing an adjacent electrode 34, which has an annular raised area 92 which opposes area 56 of the opposite electrode. The trigger arrangement 36 has a trigger pin 48 with insulative sleeve 50 to separate the pin 48 from annular region 94 which is integral with the adjacent electrode 34. Annular region 94 functions the same as the trigger electrode 44 of FIG. 4. The trigger discharge occurs, as the signal is applied to the pin 48, between the pin end 49 and region 94. The plasma generated by the trigger discharge travels along the bore 96 in the adjacent electrode 34 into the spark gap region between area 56 and annular region 92. On initiating the main discharge, the spark travels to annular raised area 92 and is so spaced from the insulative sheath 50 to thereby prevent such discharge having an effect on the structural integrity of this insulative material.

Although barium titanate is a preferred form of insulative material, it is appreciated that other materials having dielectric constants greater than 80 are available, such as $TiO_2$, $LiNbO_3$ and KDP (potassium dideuterophosphate $KH_2PO_4$).

The use of the insulative material, which may have a dielectric constant greater than 80, provides for a more efficient triggering system for the spark gap, in terms of requiring a lower voltage signal to generate a trigger discharge and also to facilitate the physical location of the trigger pin relative to an adjacent trigger electrode. The insulative material may be in contact with both the trigger pin and electrode to establish a minimum spacing, so that consistency is obtained in the generation of the trigger discharge. In systems of the prior art which do not employ the use of a high dielectric constant material in the trigger electrode arrangement, substantially higher voltages are needed for the trigger signal. For example, with some arrangements 20,000 volt signal is required which is difficult, if not impossible, to generate in short periods such as ten nanoseconds and requires far more complex electrical equipment than that needed to generate the 4000 volt trigger signal.

The arrangement, according to this invention, provides for the continued use of the dielectric material. It was experienced in using the insulative material in the manner suggested by the previously referred to paper by Lavoie et al that, for frequencies of usage of approximately 10 hertz, the barium titanate would begin to fracture and chip away after approximately two hours use. The lifetimes reported by Lavoie et al were not experienced. It is difficult to speculate as to why the lifetimes of Lavoie et al were not realized; however, it is believed this may be due to Lavoie switching at substantially lower power loads. The advantages in using a dielectric material, as suggested by Lavoie et al, could not be commercially realized in switching the high power loads in the firing of a laser. The arrangement, however according to this invention, provides a structure which positions the triggering arrangement behind the adjacent electrode of the spark gap. As can be gathered from the preferred embodiments discussed, the location of the dielectric material is such that the main discharge arc is prevented from having any substantive degradative effect on the structural integrity of the material. According to the preferred embodiments of FIGS. 4, 5 and 6, this is accomplished by spacing the insulative sleeve 50 a sufficient distance from the adjacent electrode area.

Although the preferred insulative material has a high dielectric constant, that is materials which have dielectric constants in excess of 80, it is appreciated that any other forms of solid insulative materials may be used which would be subject to degradation if exposed directly to the main discharge arc. For example, other solid insulative materials, which may be used, are those of synthetic plastics such as Mylar (trademark to identify a polyethylene terephthalate sold by Dupont) and Delrin (trademark to identify the acetal resin sold by Dupont) which have dielectric constants less 10. Epoxies are also usable which have dielectric constants in the range of 30 to 35. Other usable forms of insulative materials may be the more common forms of ceramics which would have dielectric constants less than 10, such as boron nitride. It is appreciated that in using insulative materials having the lower dielectric constants a thinner section of insulative material would be used and that with some arrangements, it may be necessary to use a trigger signal of a higher voltage. This could result in increased jitter for the spark gap; however, with some applications this may be acceptable. In using the arrangement, according to this invention, the insulative material, whether it be a plastic such as Mylar or other ceramics, continues to be protected from the hazardous effects of the main discharge arc. For example, with Mylar if subjected to the main discharge arc would degrade rapidly due to the heat generated. In locating the Mylar in the trigger arrangement, which creates a corona discharge at lower temperatures, it is thereby protected according to the arrangement of this invention from the effects of the main discharge arc. Preferably the insulative material, as it surrounds the trigger pin of the trigger arrangement shown in FIGS. 4, 5 and 6, have intimate contact therewith to minimize air gaps between the insulative material and the trigger pin to provide for a better corona discharge when the trigger signal is applied to the trigger arrangement.

In terms of the longevity of the device, it has been experienced, in using barium titanate as the insulative material, that up to five million discharges can be expected before it is necessary to disassemble the unit to clean around the trigger area. No structural degredation of the insulative sleeve was evident after the many million discharges.

Various types of gases may be used in the spark gap enclosure, such as nitrogen, helium argon. Sulphur hexafloride provides a very good form of insulative gas; however, it is corrosive and expensive, so that it is not always desirable to use unless a particular application so requires.

It is appreciated that the polarity of the spark gap is not crucial in that the system could work as well with the reversal of polarities on the opposite and adjacent electrodes. There may, however, be an experience of greater delay before main discharge arcing occurs, because the electrons generated by the trigger discharge would be attracted to adjacent electrode 34. However, the photons generated by the trigger discharge are not polarity sensitive and would radiate and flow into the spark gap region to initiate the breakdown.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A spark gap switch comprising a pair of electrodes having opposing areas spaced apart a predetermined distance to establish said spark gap where a main discharge arc occurs between said opposing electrode areas when said spark gap is triggered, said pair of electrodes constituting the opposite and adjacent electrodes of said spark gap switch, a trigger device having a trigger pin spaced apart from a trigger electrode, a solid insulative material provided between said spaced-apart trigger pin and trigger electrode, said insulative material having a high dielectric constant, said adjacent electrode being a disc supported by a perforated plate in front of and spaced from said trigger pin, said trigger pin being surrounded by said high dielectric constant material, said trigger electrode being adjacent the end of said pin to provide a trigger discharge between said pin and trigger electrode, said trigger device being located rearwardly of said adjacent electrode area relative to said adjacent electrode area to position said solid insulative material in a manner to prevent a triggered main discharge arc affecting the structural integrity of said insulative material, electrons and photons generated by a trigger discharge passing through the perforations in said plate in moving towards said opposite electrode.

2. A spark gap switch of claim 1, wherein said disc has a raised portion nearest said opposite electrode.

3. In a laser having spaced-apart laser electrodes which define a laser cavity, a switch for controlling the firing of said laser, said switch comprising a spark gap having a pair of electrodes which constitute the opposite and adjacent electrodes of said spark gap, said opposite electrode being electrically connected to one of said laser electrodes, a trigger device having a trigger pin spaced apart from a trigger electrode positioned behind said adjacent electrode relative to said opposite electrode, said opposite and adjacent electrodes having opposing areas spaced apart a predetermined distance to establish said spark gap where a main discharge arc occurs between said opposing electrode areas when said trigger device in response to a trigger electrical signal applied thereto triggers said switch, said trigger device having a high dielectric constant material surrounding said trigger pin to facilitate a trigger discharge between said trigger pin and said trigger electrode upon the application of a trigger signal, said high dielectric constant material being positioned between said trigger pin and said trigger electrode, said adjacent electrode being a disc supported by a perforated plate in front of and spaced from said trigger pin, said trigger electrode being circular and having an aperture into which said trigger pin extends with said dielectric material located between said pin and the trigger electrode aperture wall, a trigger discharge occurring between the trigger pin end and the aperture wall where electrons and photons generated by such triggered discharge pass through said perforated plate and by said adjacent electrode in moving into said spark gap, said adjacent electrode and said trigger electrode being electrically interconnected at the same voltage, the spacing of said dielectric material behind said adjacent electrode area being sufficient to prevent a triggered main discharge arc to said adjacent electrode area affecting the structural integrity of said high dielectric constant material.

4. In a laser of claim 3, said disc has a raised portion closest said opposite electrode to define said adjacent electrode area.

5. In a laser of claim 3 or 4, wherein a housing is provided for said opposite and adjacent electrodes and said trigger arrangement to contain an insulating gas in said spark gap.

6. In a laser of claim 3 or 4, said opposite electrode is mounted in a housing for said switch, said mounting providing for adjustability of the distance between said opposite and adjacent electrode areas.

7. In a laser of claim 3 or 4, said trigger pin is mounted in a housing for said switch, said mounting providing for adjustability of the position of said trigger pin relative to said trigger electrode.

* * * * *